United States Patent
Maeda et al.

(10) Patent No.: US 10,255,208 B2
(45) Date of Patent: Apr. 9, 2019

(54) DATA TRANSFER APPARATUS AND DATA TRANSFER SYSTEM

(71) Applicant: Toshiba Memory Corporation, Minato-ku, Tokyo (JP)

(72) Inventors: Seiji Maeda, Kawasaki Kanagawa (JP); Hiroyuki Usui, Kawasaki Kanagawa (JP)

(73) Assignee: Toshiba Memory Corporation, Tokyo (JP)

( * ) Notice: Subject to any disclaimer, the term of this patent is extended or adjusted under 35 U.S.C. 154(b) by 206 days.

(21) Appl. No.: 15/271,689

(22) Filed: Sep. 21, 2016

(65) Prior Publication Data

US 2017/0255577 A1    Sep. 7, 2017

Related U.S. Application Data

(60) Provisional application No. 62/303,873, filed on Mar. 4, 2016.

(51) Int. Cl.
| | | |
|---|---|---|
| *G06F 12/0811* | (2016.01) | |
| *G06F 12/1018* | (2016.01) | |
| *G06F 13/28* | (2006.01) | |
| *G06F 12/1081* | (2016.01) | |

(52) U.S. Cl.
CPC .......... *G06F 13/28* (2013.01); *G06F 12/0811* (2013.01); *G06F 12/1018* (2013.01); *G06F 12/1081* (2013.01); *G06F 2212/283* (2013.01)

(58) Field of Classification Search
None
See application file for complete search history.

(56) References Cited

U.S. PATENT DOCUMENTS

| | | | |
|---|---|---|---|
| 8,732,434 B2* | 5/2014 | Hwang | G06F 12/0238 711/216 |
| 8,825,937 B2 | 9/2014 | Atkisson et al. | |
| 9,076,530 B2 | 7/2015 | Gomez et al. | |
| 2007/0022224 A1* | 1/2007 | Bowler | G06F 13/28 710/22 |
| 2011/0202744 A1* | 8/2011 | Kulkarni | G06F 17/3033 711/216 |
| 2012/0036134 A1* | 2/2012 | Malakhov | G06F 9/5016 707/747 |
| 2012/0089578 A1* | 4/2012 | Lam | G06F 17/30159 707/692 |
| 2016/0070649 A1 | 3/2016 | Maeda | |
| 2016/0267010 A1 | 9/2016 | Maeda | |
| 2017/0017573 A1 | 1/2017 | Maeda | |
| 2017/0178600 A1* | 6/2017 | Wei | G09G 5/393 |
| 2017/0185527 A1* | 6/2017 | Ueda | G06F 12/1018 |

FOREIGN PATENT DOCUMENTS

| | | |
|---|---|---|
| JP | 04-067243 A | 3/1992 |
| JP | 02-225059 A | 9/1993 |

* cited by examiner

Primary Examiner — Elias Mamo
(74) Attorney, Agent, or Firm — White & Case LLP

(57) ABSTRACT

A data transfer apparatus according to an embodiment includes: a first main memory configured to store first data to be used by a first processor; a first hash table in which a hash value and address information of the first data stored in the first main memory are registered; and a data transfer unit configured to transfer data having a hash value not registered in the first hash table from among second data stored in a second main memory from the second main memory to the first main memory.

20 Claims, 5 Drawing Sheets

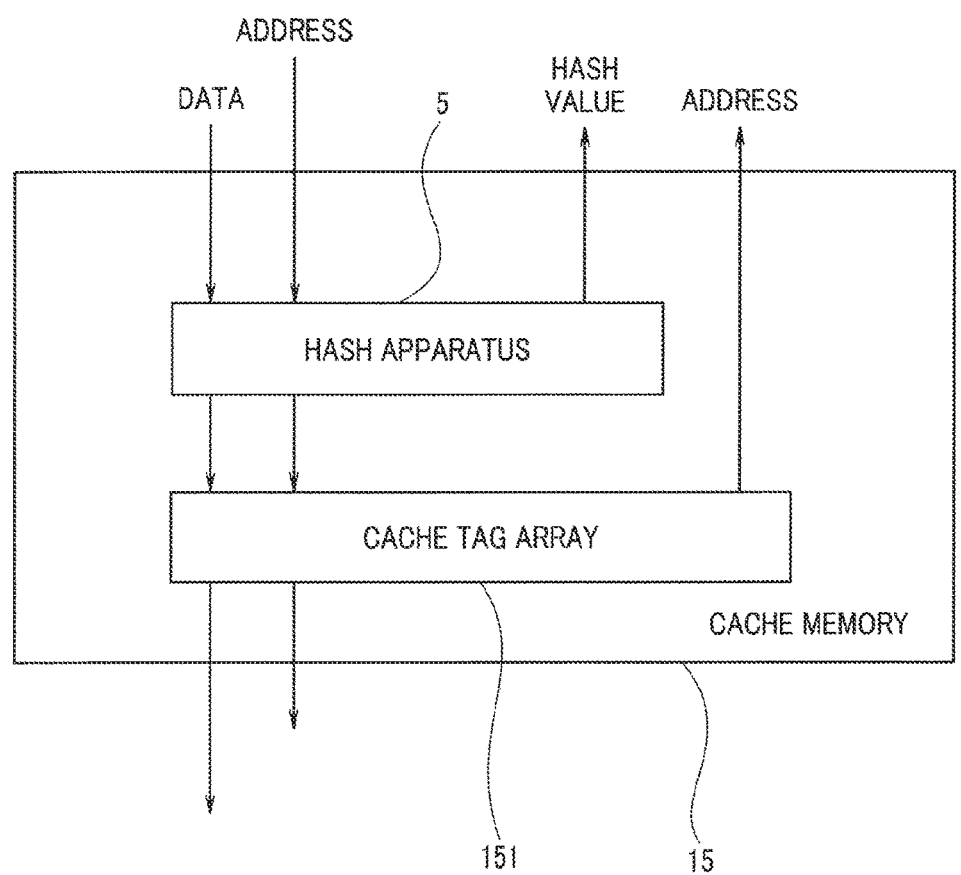

DATA TRANSFER APPARATUS AND DATA TRANSFER SYSTEM

CROSS-REFERENCE TO RELATED APPLICATIONS

This application is based upon and claims the benefit of priority from U.S. Provisional Application No. 62/303,873, filed on Mar. 4, 2016; the entire contents of which are incorporated herein by reference.

FIELD

Embodiments described herein relate generally to a data transfer apparatus and a data transfer system.

BACKGROUND

Conventionally, a method in which after data from an input apparatus such as a camera or an external storage apparatus such as an HDD/SDD is transferred to a main memory, a processor accesses the data in the main memory and operates arithmetics has been used.

In recent years, computer systems including an arithmetic processor mainly specialized for arithmetic in addition to a control processor configured to control an I/O apparatus such as an input apparatus or an external storage apparatus have been used. In general, the control processor and the arithmetic processor are connected to different interconnects, and the respective interconnects are connected via, e.g., a DMA (direct memory access) controller. Also, generally, each of the control processor and the arithmetic processor includes an individual main memory.

When the arithmetic processor operates arithmetics, a scheme is used in which data is first transferred from the I/O apparatus to the main memory for control under the control of the control processor. Next, the data is transferred from the main memory for control to the main memory for arithmetics by the DMA controller. Then, the arithmetic processor accesses the data on the main memory for arithmetics and operates arithmetics.

However, in the case of the above method, the amount of data transfer by the DMA controller is large, causing the problem of increasing the time required for processing.

BRIEF DESCRIPTION OF THE DRAWINGS

FIG. 6 is a schematic block diagram illustrating an example of a cache memory 15.

DETAILED DESCRIPTION

Embodiments will be described below with reference to the drawings.

First Embodiment (Configuration)

Figure 1:
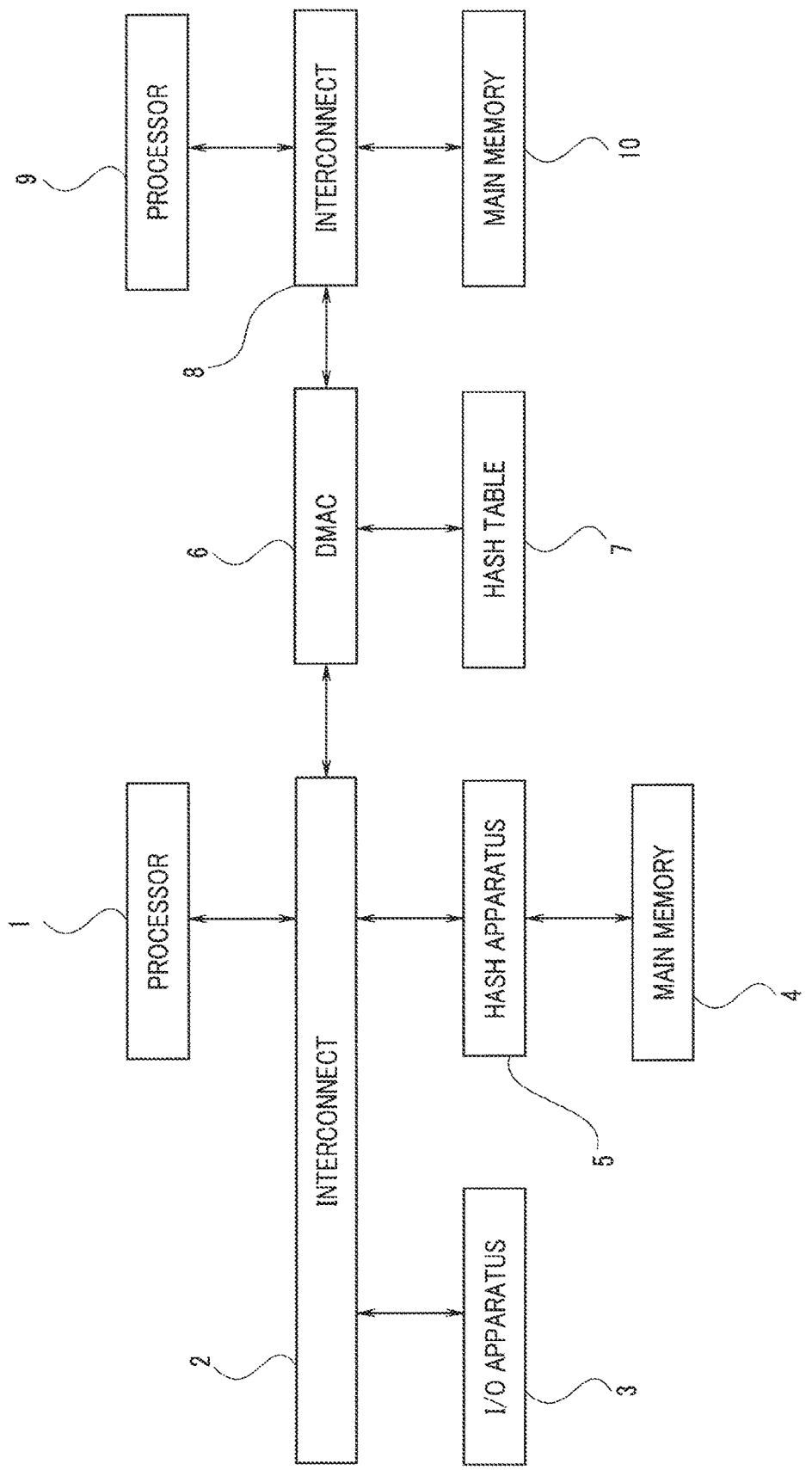
FIG. 1 is a schematic block diagram illustrating an example of a system including a data transfer apparatus according to a first embodiment.

FIG. 1 is a schematic block diagram illustrating an example of a system including a data transfer apparatus according to a first embodiment. The system according to the present embodiment mainly consists of processors 1, 9, interconnects 2, 8, an I/O apparatus 3, main memories 4, 10, a hash apparatus 5, a DMA controller (hereinafter referred to as "DMAC") 6 and a hash table 7.

The processor 1, the I/O apparatus 3, the hash apparatus 5 and the DMAC 6 are interconnected via the interconnect 2. Also, the main memory 4 is connected to the hash apparatus 5. The processor 9, the main memory 10 and the DMAC 6 are interconnected via the interconnect 8. Here, the DMAC 6 is connected between the interconnect 2 and the interconnect 8. Where the system in FIG. 1 is, for example, a computer system, the processor 1 corresponds to a control processor and the processor 9 corresponds to an arithmetic processor.

The processor (second processor) 1 controls the I/O apparatus 3, the hash apparatus 5 and the DMAC 6. More specifically, when data inputted from the I/O apparatus 3 is written to the main memory 4, the processor 1 makes the hash apparatus 5 operates an arithmetic to calculate a hash value. Also, the processor 1 provides a command to make the DMAC 6 perform data transfer.

The I/O apparatus 3 inputs data from the outside to the main memory 4, and outputs data from the main memory 4 to the outside. For example, an input apparatus such as a camera or an external storage apparatus such as an HDD/SDD corresponds to the I/O apparatus 3.

The main memory (second main memory) 4 stores data inputted from the I/O apparatus 3, and outputs data to the main memory 10 via the DMAC 6, under the control of the processor 1.

Figure 2:
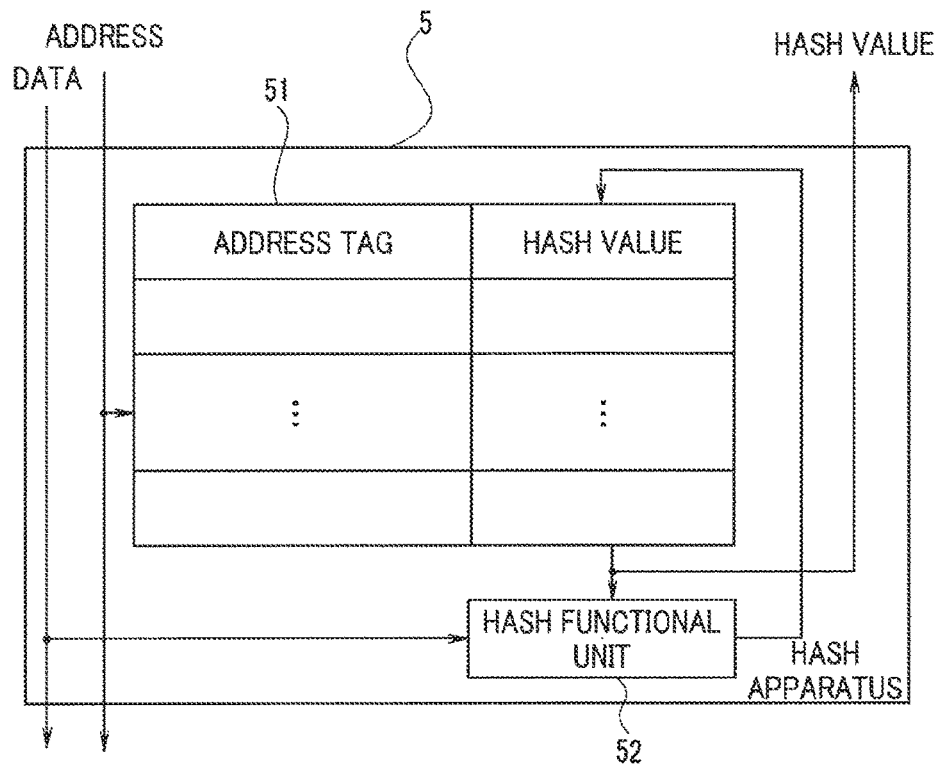
FIG. 2 is a schematic block diagram illustrating an example of a hash apparatus 5.

The hash apparatus (hash management section) 5 calculates and retains a hash value of data inputted from the I/O apparatus 3, under the control of the processor 1. FIG. 2 is a schematic block diagram illustrating an example of the hash apparatus 5. The hash apparatus 5 mainly consists of a tag table 51 and a hash functional unit 52.

The tag table (second hash table) 51 retains hash values of data inputted from the I/O apparatus 3. The tag table 51 includes one or more tag entries. Each tag entry includes two fields that are an address tag and a hash value. The address tag is a tag for identifying an address of a destination in which data is to be stored in the main memory 4. The address tag is created by extracting a particular length of high-order bits of the address. For example, if the address has a width of 32 bits and a hash calculation unit is 4 KB, the address tag is created by extracting high-order 20 bits of the address. The hash value is calculated based on data written to the main memory 4.

The hash functional unit 52 calculates a hash value from data from the I/O apparatus 3 and data inputted from the tag table 51, using, e.g., a predetermined hash function. Then, the calculated hash value is recorded as a hash value in a predetermined tag entry in the tag table 51.

The DMAC 6 (data transfer unit) transfers data from the main memory 4 to the main memory 10, under the control of the processor 1. Upon receipt of notification of an address in the main memory 4, which is a transfer source, and a hash value of data to be transferred from the processor 1, the DMAC 6 refers to the hash table 7 to check whether the provided hash value is included.

Figure 3:
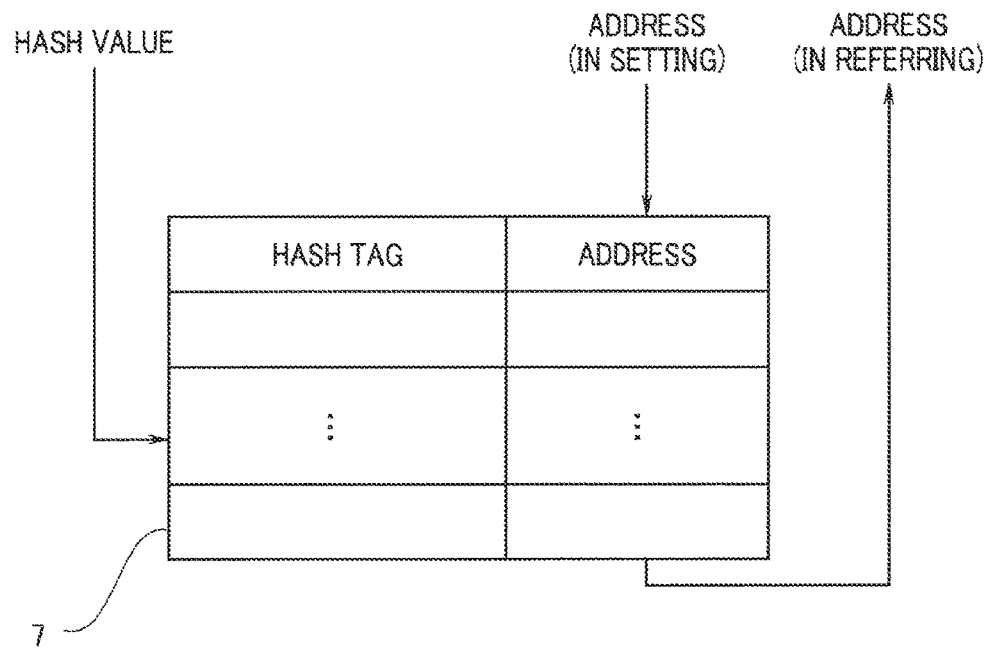
FIG. 3 is a diagram illustrating an example of a hash table 7.

The hash table (first hash table) 7 retains hash values of data recorded in the main memory 10 and addresses at which the data are stored. FIG. 3 is a diagram illustrating an example of the hash table 7. The hash table 7 includes one or more hash entries. Each hash entry includes fields of a hash tag and an address. The hash tag is a hash value of data stored in the main memory 10. The address is an address at which the data is registered in the main memory 10.

If the provided hash value is not registered in the hash table 7, the DMAC 6 transfers the data from the main memory 4 to the main memory 10 and updates the hash table 7 using the transferred data and an address of a destination of the transfer. Then, the DMAC 6 provides notification of the address of the destination of the transfer of the data in the main memory 10, to the processor 9. On the other hand, if the provided hash value is registered in the hash table 7, the DMAC 6 does not perform data transfer, but provides notification of an address of a hash entry having the provided hash value to the processor 9 as an address in the main memory 10.

The processor (first processor) 9 reads the data from the main memory 10 based on the address provided from the DMAC 6, and performs predetermined processing.

The main memory (first main memory) 10 stores the data transferred from the main memory 4 or outputs the data to the processor 9, according to a command from the DMAC 6.

(Operation)

Next, operation of the system according to the present embodiment will be described. A series of operations performed by the processor 9 using data inputted from the I/O apparatus 3 will be described below.

1) Data Acquisition

First, the processor 1 provides a data input command with an address in the main memory 4 designated, to the I/O apparatus 3. The I/O apparatus 3 writes data to the designated address. Here, the hash apparatus 5 calculates a hash value from the written data and registers the hash value in a predetermined tag entry together with the designated address.

Specific operation of the hash apparatus 5 is as follows. First, upon receipt of an input of a write destination address and data from the I/O apparatus 3 via the interconnect 2, the hash apparatus 5 extracts a particular length of high-order bits of the inputted address, according to a unit by which a hash value is calculated, and thereby creates a comparison address tag. The length of the comparison address tag is the same as a length of an address tag in the tag table 51.

Next, a search is performed to determine whether or not an address tag identical to the comparison address tag is included in the tag table 51. If the identical address tag is included, a hash value of the address tag is outputted to a hash functional unit 52. On the other hand, if no identical address tag is included, one tag entry for new registration is selected from the tag table 51, and the comparison address tag is registered as an address tag and 0 is registered as a hash value. Then, 0 is outputted to the hash functional unit 52.

The hash functional unit 52 calculates a hash value using the value inputted from the tag table 51 and the data inputted from the I/O apparatus 3. For example, the hash value is obtained by adding a result of arithmetic of the data inputted from the I/O apparatus 3 using the predetermined hash function to the value inputted from the tag table 51. The hash functional unit 52 records the calculated hash value in the selected tag entry.

2) Data Transfer

First, the processor 1 provides notification of an address in the main memory 4 at which transfer data is stored, to the hash apparatus 5. The hash apparatus 5 creates a comparison address tag from the provided address (hereinafter, referred to as "transfer source address"), and extracts a tag entry in which an address tag identical to the comparison address tag is recorded, from the tag table 51. Then, the hash apparatus 5 provides notification of the hash value in the tag entry to the processor 1.

Next, the processor 1 provides notification of the transfer source address and the hash value to the DMAC 6, and provides a command for data transfer to the main memory 10.

The DMAC 6 refers to the hash table 7 to check whether or not the provided hash value is included. If the provided hash value is registered in the hash table 7, the DMAC 6 does not perform data transfer, but provides notification of an address of the hash entry having the provided hash value, to the processor 9 as an address in the main memory 10.

On the other hand, if the provided hash value is not registered in the hash table 7, the DMAC 6 secures an area for the data to be transferred in the main memory 10, and transfers the data from the transfer source address in the main memory 4 to the area in the main memory 10. Then, the DMAC 6 registers the provided hash value and an address to which the data has been transferred in the main memory 10, in a new hash entry in the hash table 7. Furthermore, the DMAC 6 provides the registered address to the processor 9 as an address in the main memory 10.

3) Data Reading

The processor 9 reads data stored in a provided address from the main memory 10 and performs predetermined processing.

As described above, according to the present embodiment, hash values of data stored in the main memory 10 are registered in the hash table 7 as hash tags. When the processor 9 reads data, the DMAC 6 compares a hash value of the data, which has been calculated by the hash apparatus 5, with the hash tags registered in the hash table 7. If there is a hash tag that is the same as the hash value, desired data is included in the main memory 10. Thus, no data transfer from the main memory 4 to the main memory 10 is performed. Data transfer is performed only if there is no hash tag that is the same as the hash value. Therefore, the amount of data transfer from the main memory 4 to the main memory 10 can be reduced.

Also, conventionally, an address in a main memory 4 of data transferred from the main memory 4 to a main memory 10 is registered as a tag. Then, when a processor 9 accesses the main memory 4, the processor 9 confirms data identity by comparing the address of the data in the main memory 4 and the registered tag. In other words, whether or not to perform data transfer from the main memory 4 to the main memory 10 is determined according to whether or not there is a tag that is the same as the address.

However, if there are identical data at different addresses in the main memory 4 and the main memory 10, the conventional confirmation using the addresses results in determination that the data are not identical to each other. In this case, although desired data is included in the main memory 10, the data is transferred from the main memory 4 to the main memory 10.

On the other hand, according to the present embodiment, hash values of data stored in the main memory 10 are registered in the hash table 7 as hash tags. Identity of data is confirmed using the hash values, and thus, even if there are identical data at different addresses in the main memory 4 and the main memory 10, it is possible to determine that the data are identical. Therefore, the amount of data transfer from the main memory 4 to the main memory 10 can further be reduced.

Note that, although the present embodiment is configured so that the hash apparatus 5 performs hash value calculation, comparison address tag creation and management of the tag table 51, a configuration in which the processor 1 performs hash value calculation, comparison address tag creation and management of the tag table 51 and the hash apparatus 5 is not included may be employed.

Also, objects for which a hash value is calculated do not need to be all data written from the I/O apparatus 3 to the main memory 4, and may be, for example, limited to data satisfying a predetermined condition such as data written as read-only data.

Figure 4:
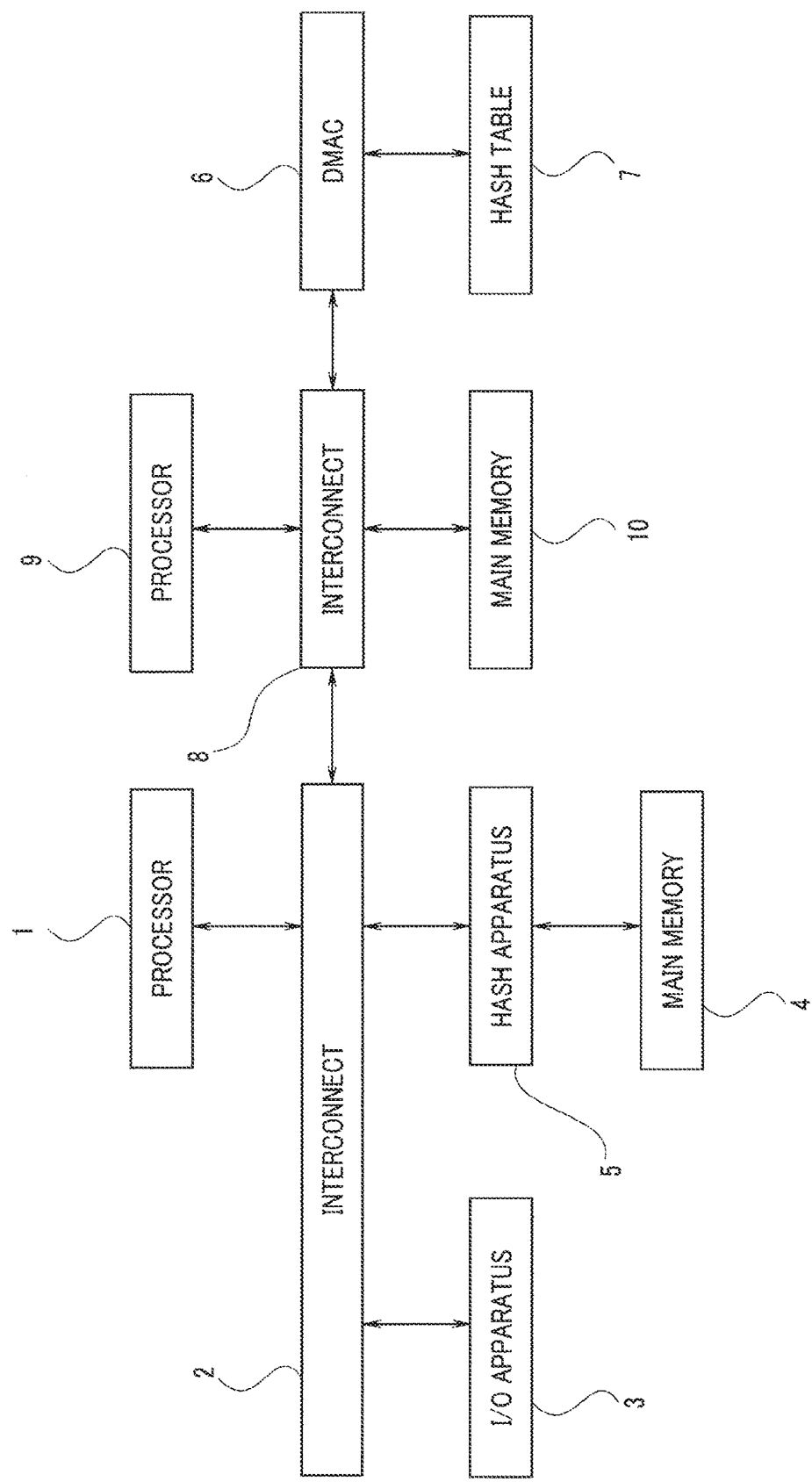
FIG. 4 is a schematic block diagram illustrating another example of the system including a data transfer apparatus according to the first embodiment.

Furthermore, in the present embodiment, the DMAC 6 is connected between the interconnect 2 and the interconnect 8, it is only necessary that the DMAC 6, the interconnect 2 and the interconnect 8 be able to transmit/receive data to/from one another. FIG. 4 is a schematic block diagram illustrating another example of a system including the data transfer apparatus according to the first embodiment. For example, as illustrated in FIG. 4, it is possible that: a DMAC 6 is connected only to an interconnect 8; and an interconnect 2 and the interconnect 8 are connected via a non-illustrated bridge. Or, it is possible that: the DMAC 6 is connected only to the interconnect 2; and the interconnect 2 and the interconnect 8 are connected via a non-illustrated bridge. Also, it is possible that the interconnect 2 and the interconnect 8 are not respectively disposed individually and are configured as one interconnect.

Also, for the main memory 10 generally including a DRAM (dynamic random access memory), which is a volatile memory, a non-volatile memory such as a NAND Flash memory or an MRAM (magnetoresistive random access memory) may be used. In the case of a volatile memory, upon turn-off of the power of the system, retained data are lost. Thus, after the power is turned on again, it is necessary to transfer data from the main memory 4 again. However, as a result of the storage apparatus being formed of a non-volatile memory, even if the power is turned off, the data are retained without being lost. Therefore, the amount of data transfer from the main memory 4 to the main memory 10 can further be reduced.

Second Embodiment (Configuration)

Figure 5:
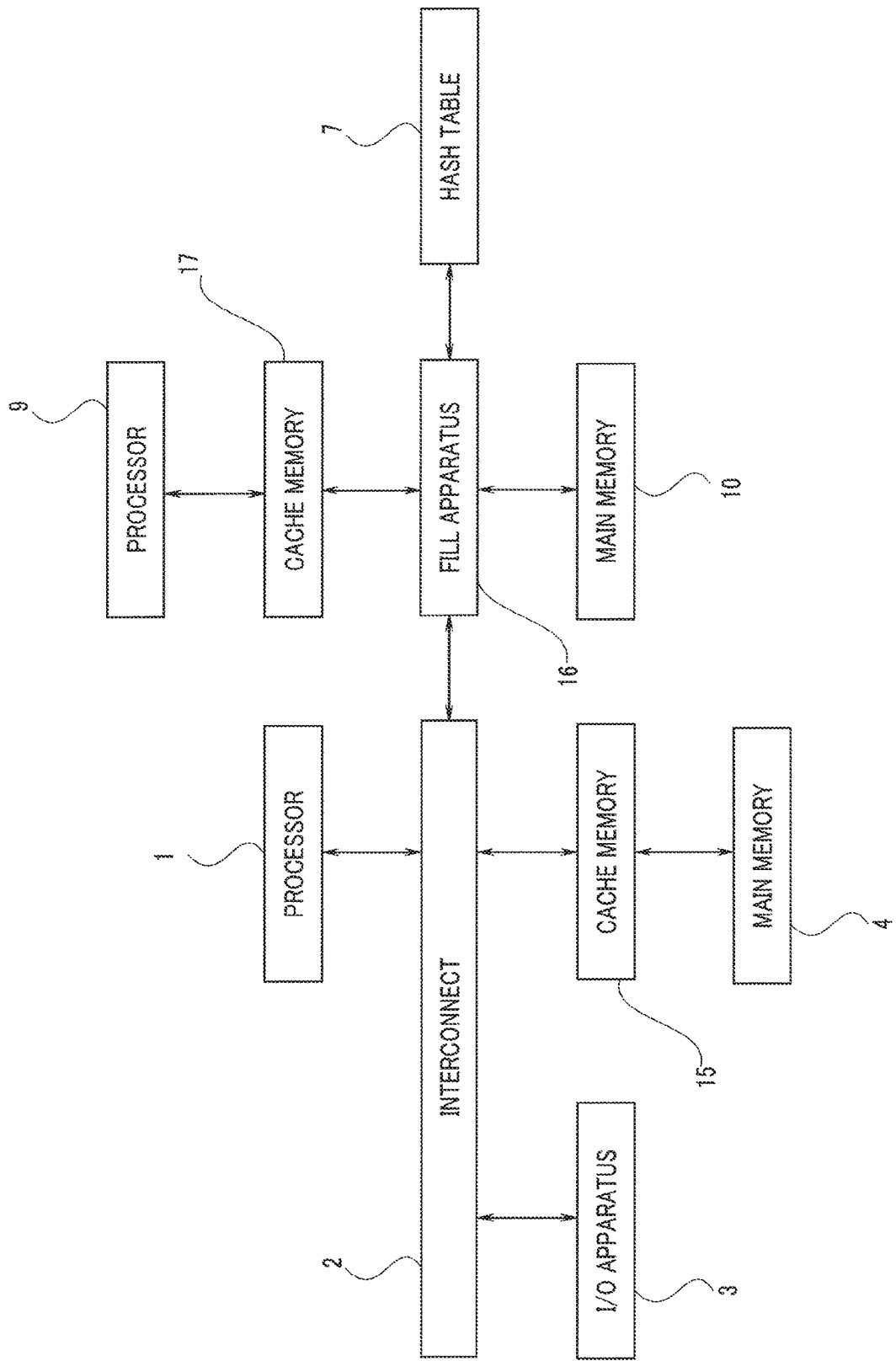
FIG. 5 is a block diagram illustrating an example of a system including a data transfer apparatus according to a second embodiment.

FIG. 5 is a schematic block diagram illustrating an example of a system including a data transfer apparatus according to a second embodiment. Components that are the same as those of the first embodiment are provided with same reference numerals and description thereof will be omitted. The system according to the present embodiment mainly consists of processors 1, 9, an interconnect 2, an I/O apparatus 3, main memories 4, 10, a hash table 7, cache memories 15, 17, and a fill apparatus 16.

The processor 1, the I/O apparatus 3, the cache memory 15 and the fill apparatus 16 are interconnected via the interconnect 2. Also, the main memory 4 is connected to the cache memory 15. Furthermore, the processor 9 is connected to the fill apparatus 16 via the cache memory 17. The hash table 7 and the main memory 10 are also connected to the fill apparatus 16. If the system in FIG. 5 is, for example, a computer system, the processor 1 corresponds to a control processor, and the processor 9 corresponds to an arithmetic processor.

The processor 1 controls the I/O apparatus 3 and the cache memory 15, and provides operation commands to the fill apparatus 16 and the processor 9. More specifically, when data inputted from the I/O apparatus 3 is written to the main memory 4, the processor 1 makes the cache memory 15 calculate a hash value. Also, the processor 1 provides a command to make the fill apparatus 16 perform data prefetch, and provides a command to make the processor 9 start processing.

The I/O apparatus 3 inputs data to the main memory 4 from the outside, and outputs data from the main memory 4 to the outside.

The main memory 4 stores data inputted from the I/O apparatus 3 and outputs data to the fill apparatus 16 via the cache memory 15 and the interconnect 2.

The cache memory 15 temporarily stores data inputted from the I/O apparatus 3, and calculates and retains a hash value of the data. FIG. 6 is a schematic block diagram illustrating an example of the cache memory 15. The cache memory 15 mainly includes the hash apparatus 5 and a cache tag array 151. The cache tag array 151 has a configuration that is similar to those of cache tag and data arrays included in a general cache memory.

The fill apparatus (data transfer unit) 16 acquires data from, e.g., the main memory 4, the cache memory 15 or the main memory 10, and stores the data into the cache memory 17. Upon receipt of a data fetch command from the processor 1 or a cache fill command from the cache memory 15, the fill apparatus 16 searches for a site in which data to be filled into the cache memory 15 is stored, using the hash table 7. Then, the fill apparatus 16 acquires the data and stores the data into the cache memory 15. Note that the fill apparatus 16 can store the acquired data into the main memory 10.

The cache memory 17 is a general one including cache tag and data arrays.

Upon receipt of a processing start command from the processor 1, the processor 9 reads data from the cache memory 17 and performs predetermined processing.

The main memory 10 inputs/outputs data via the fill apparatus 16. More specifically, the main memory 10 stores data acquired from the main memory 4 or the cache memory 15, and outputs data to the cache memory 17.

(Operation)

Next, operation of the system in the present embodiment will be described. In the system according to the present embodiment, mainly, prefetch operation and read operation are performed. Prefetch operation is operation for storing data into the cache memory 17 in advance mainly by means of the processor 1 before the processor 9 performs predetermined processing. Read operation is operation for reading data from the cache memory 17 after the processor 9 starts predetermined processing.

First, prefetch operation will be described.

1) Data Acquisition

First, processor 1 provides a data input command with an address in the main memory 4 designated, to the I/O apparatus 3. The I/O apparatus 3 writes data to the designated address. Here, the cache memory 15 calculates a hash value from the written data and registers the hash value in a predetermined tag entry together with the designated address.

2) Prefetch Operation

First, the processor 1 provides notification of an address at which data for prefetch is stored in the main memory 4 to the cache memory 15. The cache memory 15 creates a comparison address tag from the provided address (hereinafter referred to as "designated address") and extracts a tag entry in which an address tag identical to the comparison address tag is recorded from a tag table 51 in the hash apparatus 5. Then, the cache memory 15 provides notification of a hash value in the tag entry to the processor 1.

Next, the processor 1 provides notification of the designated address and the acquired hash value and a data prefetch command to the fill apparatus 16.

The fill apparatus 16 refers to the hash table 7 to check whether or not the provided hash value is included. If the provided hash value is registered in the hash table 7, the fill apparatus 16 extracts an address in a hash entry having the provided hash value, and reads data at the address in the main memory 10 and stores the data into the cache memory 17. Note that, when the fill apparatus 16 stores the data into the cache memory 17, an address tag created from the designated address is registered in the cache tag, and the data read from the main memory 10 is registered in the data array, respectively.

On the other hand, if the provided hash value is not registered in the hash table 7, the fill apparatus 16 reads the cache tag and the predetermined data registered in the data array in the cache memory 15, via the interconnect 2, and stores the cache tag and the predetermined data into the cache memory 17. Here, if data at the designated address is not registered in the cache memory 15, the fill apparatus 16 reads data stored at the designated address in the main memory 4 and stores the data into the cache memory 17. More specifically, the fill apparatus 16 registers an address tag created from the designated address and data read from the cache memory 15 or the main memory 4, in the cache tag and data array, respectively.

Here, if the provided hash value is not registered in the hash table 7, the fill apparatus 16 may register the data read from the main memory 4 in the main memory 10, together with the cache memory 17, or register the data in the main memory 10 rather than the cache memory 17. In other words, the fill apparatus 16 may read predetermined data from the cache memory 15 or the main memory 4 and register predetermined data in at least either one of the register cache memory 17 and the main memory 10. When the fill apparatus 16 registers data in the main memory 10, the fill apparatus 16 selects one hash entry for new registration from the hash table 7, and registers the provided hash value as a hash tag and an address at which the data is registered in the main memory 10 as an address, respectively.

3) Data Reading

The processor 9 designates an address and reads desired data from the cache memory 17 and performs predetermined processing.

As described above, in prefetch operation, the fill apparatus 16 in the present embodiment compares a hash value of a data for prefetch, which has been calculated by the cache memory 15, with hash tags registered in the hash table 7. If there is a hash tag that is the same as the hash value, the desired data is included in the main memory 10, and thus, the fill apparatus 16 stores the predetermined data from the main memory 10 to the cache memory 17. Only if there is no hash tag that is the same as the hash value, the fill apparatus 16 performs transfer of data from the cache memory 15 or the main memory 4 to the main memory 10 and stores the data into the cache memory 17. Therefore, the amount of data transfer (amount of data transfer from the cache memory 15 or the main memory 4 to the fill apparatus 16) via the interconnect 2 can be reduced.

Next, read operation will be described.

1) Data Acquisition

First, the processor 1 provides a data input command with an address in the main memory 4 designated, to the I/O apparatus 3. The I/O apparatus 3 writes data to the designated address. Here, the cache memory 15 calculates a hash value from the written data and registers the hash value in a predetermined tag entry together with the designated address.

2) Read Operation

First, the processor 1 provides notification of an address at which data is stored (designated address) in the main memory 4 and a start of processing, to the processor 9.

The processor 9 tries to read the data at the designated address from the cache memory 17. If the data at the designated address is not registered in the cache memory 17, the cache memory 17 provides a command to store the data at the designated address, to the fill apparatus 16.

The fill apparatus 16 requests the processor 1 to provide notification of a hash value of the data registered at the designated address.

The processor 1 requests the cache memory 15 to notify the hash value of the data registered at the designated address. The cache memory 15 creates a comparison address tag from the designated address, and extracts a tag entry in which an address tag identical to the comparison address tag is registered, from the tag table 51. Then, the cache memory 15 provides notification of a hash value in the tag entry, to the processor 1. The processor 1 provides notification of the acquired hash value, to the fill apparatus 16.

Here, the fill apparatus 16 may directly request the cache memory 15 to provide notification of the hash value of the data registered at the designated address, and the cache memory 15 may directly provide notification of the hash value to the fill apparatus 16.

The fill apparatus 16 refers to the hash table 7 to check whether or not the provided hash value is included. If the provided hash value is registered in the hash table 7, the fill apparatus 16 extracts an address of a hash entry having the provided hash value, reads data at the address in the main memory 10 and stores the data into the cache memory 17.

On the other hand, if the provided hash value is not registered in the hash table 7, the fill apparatus 16 reads the relevant cache tag and the relevant predetermined data registered in the data array in the cache memory 15 and stores the cache tag and the predetermined data into the cache memory 17. Here, if the data at the designated address is not registered in the cache memory 15, the fill apparatus 16 reads the data stored at the designated address in the main memory 4 and stores the data into the cache memory 17.

Here, the fill apparatus 16 registers the data read from the cache memory 15 or the main memory 4 also in the main memory 10. When the fill apparatus 16 registers the data in the main memory 10, the fill apparatus 16 selects one hash entry for new registration from the hash table 7, and registers the provided hash value as a hash tag and the address at which the data is registered in the main memory 10 as an address, respectively.

Lastly, the cache memory 17 transmits the data at the designated address to the processor 9.

As described above, also in read operation, the fill apparatus 16 in the present embodiment compares a hash value of data stored at a designated address in the main memory 4, with the hash tags registered in the hash table 7. If there is a hash tag that is the same as the hash value, desired data is included in the main memory 10 and thus, the fill apparatus 16 stores the predetermined data from the main memory 10 into the cache memory 17. Only if there is no hash tag that is the same as the hash value, the fill apparatus 16 performs transfer of data from the cache memory 15 or the main memory 4 to the main memory 10 and stores the data into the cache memory 17. Therefore, the amount of data transfer (amount of data transfer from the cache memory 15 or the main memory 4 to the fill apparatus 16) via the interconnect 2 can be reduced.

Although the above-described embodiment is configured so that the cache memory 15 performs hash value calculation, comparison address tag creation and management of the tag table 51, the processor 1 may perform hash value calculation, comparison address tag creation and management of the tag table 51. In this case, like the cache memory 17, the cache memory 15 may be configured as a normal cache memory including no hash apparatus 5. Also, a configuration in which the cache memory 15 itself is not provided and the fill apparatus 16 reads data directly from the main memory 4 may be employed.

Also, objects for which a hash value is calculated do not need to be all data written from the I/O apparatus 3 to the main memory 4, and may be, for example, limited to data satisfying a predetermined condition such as data written as read-only data.

Furthermore, instead of the main memory 10 being formed of a DRAM, which is a volatile memory, as normal, the main memory 10 may be formed of a non-volatile memory such as a NAND Flash memory or an MRAM. As a result of the main memory 10 being formed of a non-volatile memory, even if the power is turned off, data stored in the storage apparatus is retained without being lost. Therefore, the amount of data transfer from the main memory 4 and the cache memory 15 to the main memory 10 can further be reduced.

As described above, according to the present embodiments, the amount of data transfer between two main memories interconnected via an interconnect can be reduced, enabling reduction in processing time.

The respective "units" and "apparatuses" such as modules in the present description are conceptual ones corresponding to the respective functions in the embodiments, and do not necessarily correspond to particular hardware pieces and software routines on a one-to-one basis. Therefore, in the present description, the description of the embodiments has been provided assuming virtual circuit blocks (units) having the respective functions in the embodiments.

While certain embodiments have been described, these embodiments have been presented by way of example only, and are not intended to limit the scope of the inventions. Indeed, the novel devices described herein may be embodied in a variety of other forms; furthermore, various omissions, substitutions and changes in the form of the devices described herein may be made without departing from the spirit of the inventions. The accompanying claims and their equivalents are intended to cover such forms or modifications as would fall within the scope and spirit of the inventions.

What is claimed is:

1. A data transfer apparatus comprising:
   a first main storage apparatus;
   a first processor configured to process first data stored in the first main storage;
   a first hash table in which a hash value and address information of the first data stored in the first main storage apparatus are registered; and
   a data transfer unit configured to determine whether a hash value of second data stored in a second main storage apparatus that is different from the first main storage apparatus is registered in the first hash table, to transfer the second data from the second main storage apparatus to the first main storage apparatus if the hash value of the second data is not registered in the first hash table, and not to transfer the second data from the second main storage apparatus to the first main storage apparatus if the hash value of the second data is registered in the first hash table.

2. The data transfer apparatus according to claim 1, further comprising a hash management section configured to calculate hash values of the second data and register the hash values and address information of the second data in a second hash table.

3. The data transfer apparatus according to claim 1, wherein the first main memory includes a non-volatile memory.

4. The data transfer apparatus according to claim 1, wherein the data transfer between the first and second main memories is performed via an interconnect.

5. The data transfer apparatus according to claim 1, wherein DMA transfer is used for the data transfer from the second main memory to the first main memory.

6. The data transfer apparatus according to claim 2, wherein the address information of the second data includes addresses in the second main memory.

7. A data transfer apparatus comprising:
   a first cache apparatus configured to temporarily store first data;
   a first main storage apparatus configured to store the first data;
   a first processor configured to process the first data stored in the first cache apparatus;
   a first hash table in which a hash value and address information of the first data stored in the first main storage apparatus are registered; and
   a data transfer unit configured to determine whether a hash value of second data stored in a second main storage apparatus that is different from the first main storage apparatus is registered in the first hash table, to transfer the second data stored in the second main storage apparatus from the second main storage apparatus to at least one of the first main storage apparatus and the first cache apparatus if the hash value of the second data is not registered in the first hash table, and not to transfer the second data from the second main storage apparatus to the first main storage apparatus or the first cache apparatus if the hash value of the second data is registered in the first hash table.

8. The data transfer apparatus according to claim 7, further comprising a hash management section configured to calculate hash values of the second data, and register the hash values and address information of the second data in a second hash table.

9. The data transfer apparatus according to claim 7, wherein the data transfer between the first main memory or the first cache memory, and the second main memory is performed via an interconnect.

10. The data transfer apparatus according to claim 8, wherein the address information of the second data includes addresses in the second main memory.

11. The data transfer apparatus according to claim 7, wherein the first main memory includes a non-volatile memory.

12. The data transfer apparatus according to claim 7, further comprising a second processor connected to the data transfer unit and the second main memory,
wherein the data transfer unit transfers the second data having a hash value not registered in the first hash table, in response to a command from the second processor.

13. The data transfer apparatus according to claim 7, wherein when third data for which a read request is made from the first processor is not stored in the first cache apparatus, the data transfer unit transfers the third data stored in the second main storage apparatus to the first cache apparatus if a hash value of the third data is not registered in the first hash table.

14. The data transfer apparatus according to claim 8, wherein the first main memory includes a non-volatile memory.

15. The data transfer apparatus according to claim 14, further comprising a second processor connected to the data transfer unit and the second main memory,
wherein the data transfer unit transfers the second data having a hash value not registered in the first hash table, in response to a command from the second processor.

16. The data transfer apparatus according to claim 14, wherein when third data for which a read request is made from the first processor is not stored in the first cache memory, the data transfer unit transfers the third data stored in the second main memory to the first cache memory if a hash value of the third data is not registered in the first hash table, and transfers the third data stored in the first main memory to the first cache memory if a hash value of the third data is registered in the first hash table.

17. The data transfer apparatus according to claim 7, further comprising:
a second processor connected to the data transfer unit and the second main memory; and
a second cache memory configured to temporarily store second data to be used by the second processor,
wherein the data transfer unit transfers the second data having a hash value not registered in the first hash table from the second cache memory, in response to a command from the second processor.

18. A data transfer system comprising:
a first processor;
a first main storage apparatus configured to store first data to be used by the first processor;
a first hash table in which a hash value and address information of the first data stored in the first main storage apparatus are registered;
a second processor;
a second main storage apparatus configured to store second data to be used by the second processor; and
a data transfer unit configured to determine whether a hash value of the second data is registered in the first hash table, to transfer the second data from the second main storage apparatus to the first main storage apparatus via an interconnect if the hash value of the second data is not registered in the first hash table, and not to transfer the second data from the second main storage apparatus to the first main storage apparatus if the hash value of the second data is registered in the first hash table.

19. The data transfer system according to claim 18, further comprising a hash management section configured to calculate hash values of the second data, and register the hash values and address information of the second data in a second has table.

20. The data transfer apparatus according to claim 13, wherein the data transfer unit transfers the third data stored in the first main storage apparatus to the first cache apparatus if the hash value of the third data is registered in the first hash table.

* * * * *